United States Patent
Chou et al.

(10) Patent No.: US 7,477,589 B2
(45) Date of Patent: Jan. 13, 2009

(54) CALIBRATION METHOD FOR OPTICAL DISK DRIVE SIGNAL AND DEVICE DOING THE SAME

(75) Inventors: Chia-Hua Chou, Hsintien (TW); Chih-Cheng Chen, Hsin Chu (TW)

(73) Assignee: Mediatek Incorporation, Hsin-chu (TW)

( * ) Notice: Subject to any disclaimer, the term of this patent is extended or adjusted under 35 U.S.C. 154(b) by 772 days.

(21) Appl. No.: 11/146,034

(22) Filed: Jun. 7, 2005

(65) Prior Publication Data
US 2005/0232102 A1    Oct. 20, 2005

Related U.S. Application Data

(63) Continuation-in-part of application No. 10/623,264, filed on Jul. 18, 2003.

(51) Int. Cl.
    *G11B 7/00* (2006.01)
(52) U.S. Cl. .................... 369/116; 369/47.5; 369/53.26
(58) Field of Classification Search .................... None
    See application file for complete search history.

(56) References Cited

U.S. PATENT DOCUMENTS

| 5,060,208 A | 10/1991 | Nagai et al. |
| 5,606,468 A | 2/1997 | Kodama et al. |
| 6,944,109 B2 | 9/2005 | Wang et al. |
| 7,113,434 B2 * | 9/2006 | Akasaki et al. ............. 365/194 |
| 2001/0002864 A1 * | 6/2001 | Nomura ...................... 359/173 |
| 2001/0038586 A1 | 11/2001 | Gushima et al. |

* cited by examiner

*Primary Examiner*—Joseph Feild
*Assistant Examiner*—Joseph Haley
(74) *Attorney, Agent, or Firm*—Birch, Stewart, Kolasch & Birch, LLP

(57) ABSTRACT

The present invention with an optical disk drive controller and an optical pickup head connected together by a flexible cable is described. The device includes a delay adjusting module located within the first module for delaying a first signal by an amount specified by a calibration signal. The first module transmits the delayed first signal and a second signal through a first signal channel and a second signal channel, respectively, to the second module of the optical pickup head, a monitoring module located within the optical pickup head for receiving and reshaping the delayed first signal and the second signal so as to generate a monitor signal. A calibration signal-generating module is located within the optical disk drive controller for receiving the monitor signal so as to generate the calibration signal.

12 Claims, 7 Drawing Sheets

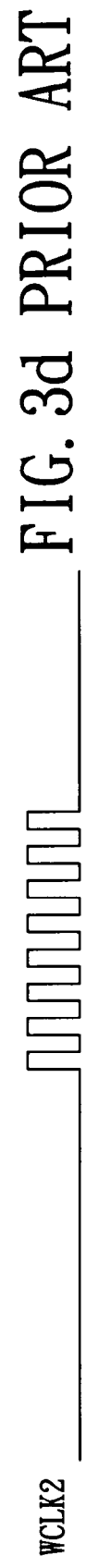
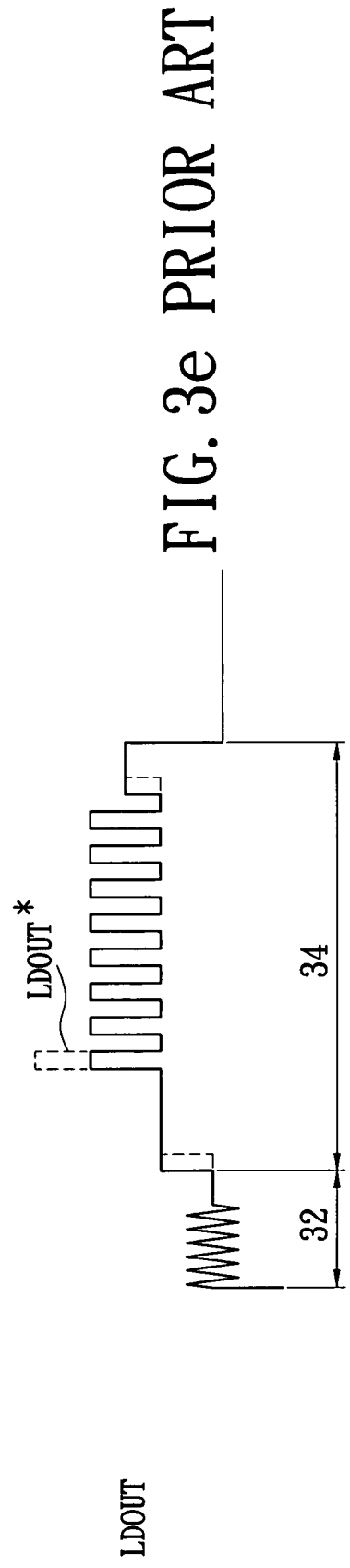
FIG. 3a PRIOR ART
FIG. 3b PRIOR ART
FIG. 3c PRIOR ART
FIG. 3d PRIOR ART
FIG. 3e PRIOR ART

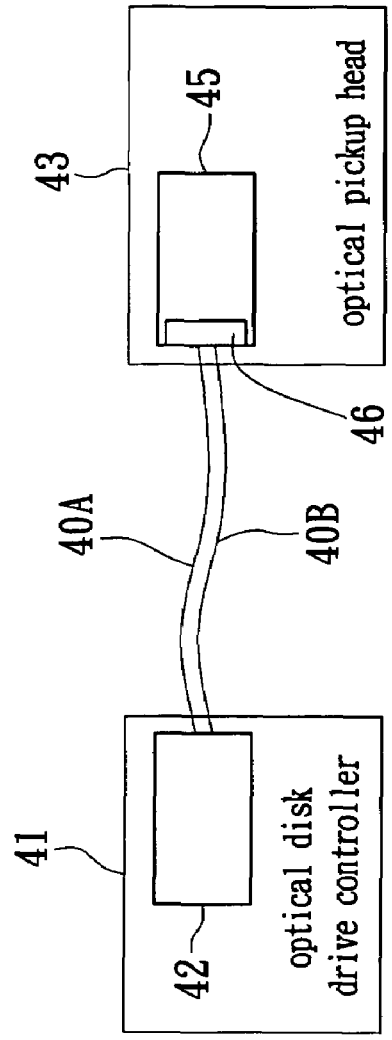
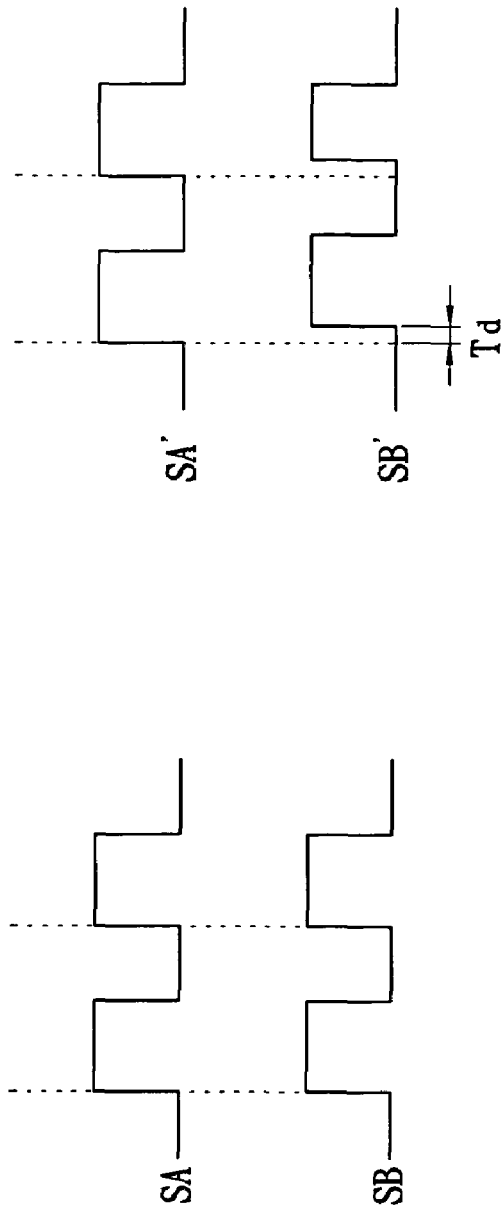
FIG. 4A
PRIOR ART
FIG. 4B
PRIOR ART

CALIBRATION METHOD FOR OPTICAL DISK DRIVE SIGNAL AND DEVICE DOING THE SAME

This Application is a Continuation-in-Part of application Ser. No. 10/623,264, filed 18, Jul. 2003, and entitled CALIBRATION OF LASER DIODE DRIVER FOR OPTICAL DISK DRIVE.

BACKGROUND OF THE INVENTION

The present invention relates to a device for calibrating signals of optical disk drive system and a method for the same, and more particularly, a calibration device and method to compromise the, timing deviation between signals due to different characteristics of the signal channels transmitting these signals.

Conventional optical disk drive systems consist of two major components, an optical pickup head and an optical disk drive controller. The optical pickup head comprises a laser diode and a laser diode driver for emitting laser beams to optical disks and a sensor for receiving reflected beams from optical disks. The weight of the optical pickup head is a primary issue for its movability, and thus the optical disk drive controller and the optical pickup head are separated devices in an optical drive system.

Generally speaking, the optical disk drive controller placed along with other electronic components on a printed circuit board is fixed to the casing of the optical disk drive system. The optical pickup head consisting of the laser diode driver is placed in one another printed circuit board, which is movable with respect to the optical disk drive system. The printed circuit board having the optical disk drive controller connects to the printed circuit board having the laser diode driver by a flexible cable for data/signal communication.

FIG. 1 is a functional block diagram showing the optical disk drive controller 10 and the optical pickup head 15. The optical disk drive controller 10 controls operations of the optical disk drive such as the rotation speed, start-up, stop, etc. Signals generated by a control module 16 are transmitted to the laser diode driver 12 through signal channels 18. Herein, a signal channel refers to the route for signal transmission, including the circuitry in the optical disk drive controller 10 (such as the circuitry on the printed circuit board), the flexible cable, and the circuitry in the optical pickup head 15.

FIG. 2 illustrates a conventional laser diode driver 12. The laser diode driver 12 receives three power control signals, three write strategy signals and two high-frequency modulation parameters, and one high-frequency modulation signal (OSCEN) from the optical disk drive controller 10. The three power control signals are the read power control signal (RADJ), the first write power control signal (WADJ1) and the second write power control signal (WADJ2), while the three write strategy signals are RCLK, WCLK1 and WCLK2 and the two high-frequency modulation parameters are FADJ and AADJ. Thereafter, the laser diode driver 12 generates a drive signal (LDOUT) to drive the laser diode 14. The laser diode driver 12 further includes a read channel driving level generator 20, a first write channel driving level generator 22, a second write channel level generator 24, a high-frequency modulator (HFM) 26 and switches 202, 222 and 242. In addition, the laser diode driver 12 may further include a controlling signal (LD_ENABLE) and a switch 282 for enabling/disabling the, drive signal (LDOUT).

The read channel driving level generator 20 receives the read power control signal RADJ and outputs a current signal $I_{RADJ}$ after some signal processing such as signal amplification and conversion from voltage to current. The current signal $I_{RADJ}$ goes through the switch 202 and is added to the drive signal LDOUT. The first waveform reshaping unit 251 receives the write strategy signal RCLK, reshape the write strategy signal into a rectangular waveform, which in turn controls the on/off state of the switch 202 by the reshaped write strategy signal RCLK.

The first write channel driving level generator 22 receives the first write power control signal WADJ1 through the first write channel and outputs another current signal $I_{WADJ1}$ after some signal processing such as signal amplification and conversion from voltage to current. The current $I_{WADJ1}$ passes through the switch 222 and is added to the drive signal LDOUT. The second waveform reshaping unit 252 receives the write strategy signal WCLK1 and reshapes the signal WCLK1 into a rectangular waveform. The reshaped write strategy signal WCLK1 is used to control the on/off state of the switch 222.

The second write channel driving level generator 24 receives the second write power control signal WADJ2 through the second write channel and generates another current signal $I_{WADJ2}$ after processing, e.g. by signal amplification and conversion from voltage to current, the second write power control signal WDAJ2. The current $I_{WADJ2}$ passes through the switch 242 and is added to the drive signal LDOUT. The third waveform reshaping unit 253 receives the write strategy signal WCLK2 and reshapes WCLK2 to be a rectangular waveform. The reshaped write strategy signal WCLK2 is used to control the on/off state of the switch 242.

The high-frequency modulator 26 receives the high-frequency parameters FADJ and AADJ for respectively controlling the frequency and amplitude, then generates another current signal $I_{HFM}$ that is a high-frequency signal. The current signal $I_{HFM}$ passes through the switch 262 and is added to the drive signal LDOUT. The switch 262 is controlled by the high-frequency modulation signal OSCEN. In addition, the laser diode driver 12 can further includes a switch 282 controlled by the controlling signal LD_ENABLE to enable or disable the drive signal LDOUT.

Refer to FIGS. 3a to 3e, the timing diagrams illustrating waveforms of signals RCLK, OSCEN, WCLK1, WCLK2 and LDOUT of laser diode driver 12 in FIG. 2. As usual, the horizontal axis represents the time axis, while the vertical axis represents the signal level axis. During the data reading stage 32, the light intensity of the laser beam emitted from the laser diode 14 is relative lower and only the read power control signal RADJ is activated. The signal level of the read strategy signal RCLK is at "high" level to turn on the switch 202, while the write strategy signals WCLK1 and WCLK2 are at "low" level to turn off the switches 222 and 242. In the meantime, the high-frequency modulation signal OSCEN is at "high" level to turn on the switch 262. Consequently, the drive signal LDOUT during the data reading stage 32 is as shown in FIG. 3e.

During the data writing stage 34, the laser beam intensity is increased to a level higher than that during the data reading stage and the first write power control signal WADJ1 and the second write power control signal WADJ2 will be activated during the data writing stage. The write strategy clock RCLK is at "high" level to turn on the switch 202, while the write strategy signals WCLK1 and WCLK2 will be switching from "high" to "low" or vice versa according to the predetermined write strategy. As a result, switches 222 and 242 are turned on/off accordingly. The high-frequency modulation signal OSCEN is at "low" level to turn off the switch 262. The exemplar drive signal LDOUT at the data writing stage 34 is shown in FIG. 3e.

As shown in FIGS. 3a to 3e, solid lines show the expected clock waveforms. However, practically the write strategy signal WCLK1 becomes WCLK1* as shown in FIG. 3c due to some sort of timing delay, the drive signal LDOUT will then become LDOUT* as shown in FIG. 3e. In this case, the resultant drive signal, denoted by LDOUT*, is obviously different from the expected one LDOUT. The damage of the laser diode 14 or the optical disk might occur due to the power shot of the drive signal LDOUT*. Additionally, the timing deviation of the write strategy signals affect the accuracy of the drive signal LDOUT, might cause the system operation error.

FIG. 4A shows signals SA and SB; output by one module 42 within the optical disk drive controller 41 and transmitted to another module 45 within the optical pickup head 43 through signal channels 40A and 40B, respectively. Signals SA and SB then are received by the waveform reshaping unit 46 in the module 45, which reshapes these signals into rectangular waveforms and generates corresponding received signals SA' and SB'. Because the characteristics of different signal channels may different, the transmission time of signal channels is generally different from each other. FIG. 4B shows the timing deviation Td between the received signals SA' and SB', even though the signals SA and SB are aligned at the transmitter side. The timing deviation Td will increase the possible errors in operations of optical disk drive systems.

In order to make up the aforementioned ill effects, the present invention provides a monitoring and calibration mechanism for the optical read/write system scheme, to achieve more stable data reading/writing performances especially in the case of data writing.

SUMMARY OF THE INVENTION

The present invention relates to a device for calibrating signals of optical disk drive system and a method for the same, and more particularly, a calibration device and method to compromise the timing deviation between signals due to different characteristics of the signal channels transmitting these signals.

In accordance with the claimed invention, the present invention incorporated into an optical disk drive system, including an optical disk drive controller, and an optical pickup head connected by a flexible cable. A first module of the optical disk drive controller transmits a plurality of signals through respective signal channels to a second module of the optical pickup head, the second module receives and reshapes the signals to have corresponding received signals, in which timing deviation occurred between the received signals. The present invention calibrates the plurality of signals before transmitted, to make up the timing deviation between the received signals. The calibration device includes a delay adjusting module located within the first module for delaying a first signal, in which the first module transmits the delayed first signal and a second signal through a first signal channel and a second signal channel respectively, to the second module of the optical pickup head, a monitoring module located within the optical pickup head for receiving and reshaping the delayed first signal and the second signal so as to generate a monitor signal reflecting the timing deviation between a first received signal and a second received signal. The first received signal and the second received signal refers to the delayed and reshaped first signal and the reshaped second signal respectively, and a calibration signal-generating module is located within the optical disk drive controller for receiving the monitor signal so as to generate the calibration signal.

The present invention further includes an optical signal calibration method including the following steps. A first signal is delayed by an amount according to a calibration signal in order to generate the delayed first signal. The delayed first signal and a second signal are transmitted through a first signal channel and a second signal channel, respectively, to the second module of the optical pickup head. The delayed first signal and the second signal are received and reshaped in order to have a first received signal and a second received signal. The timing deviation between the first received signal and the second received signal is monitored in order to have a monitor signal. The calibration signal is generated according to the monitor signal.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein:

FIG. 3a to 3e show signals waveform in the laser diode driver in FIG. 2;

FIG. 4A shows the schematic of the conventional device transmitting signals through the flexible cable;

FIG. 4B shows signals transmissions according to prior arts;

DETAILED DESCRIPTION OF THE PREFERRED EMBODIMENT

The present invention provides a device for calibrating signals of optical disk drive system and a method for the same, and more particularly, a calibration device and method to compromise the timing deviation between signals due to different characteristics of the signal channels transmitting these signals.

The present invention is to compromise the timing deviation due to different transmission characteristics of different signal channels. Herein, a signal channel refers to the route for signal transmission, including the corresponding circuitry in the optical disk drive controller (such as the circuitry on the printed circuit board), the flexible cable, and the corresponding circuitry in the optical pickup head.

Figure 1:
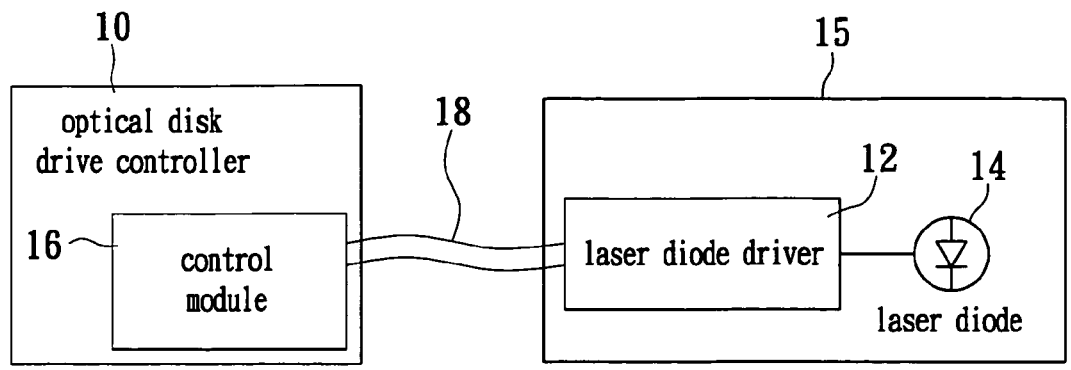
FIG. 1 is, a functional block diagram showing the optical disk drive controller and the laser diode driver of the conventional optical disk drive read/write device.
Figure 2:
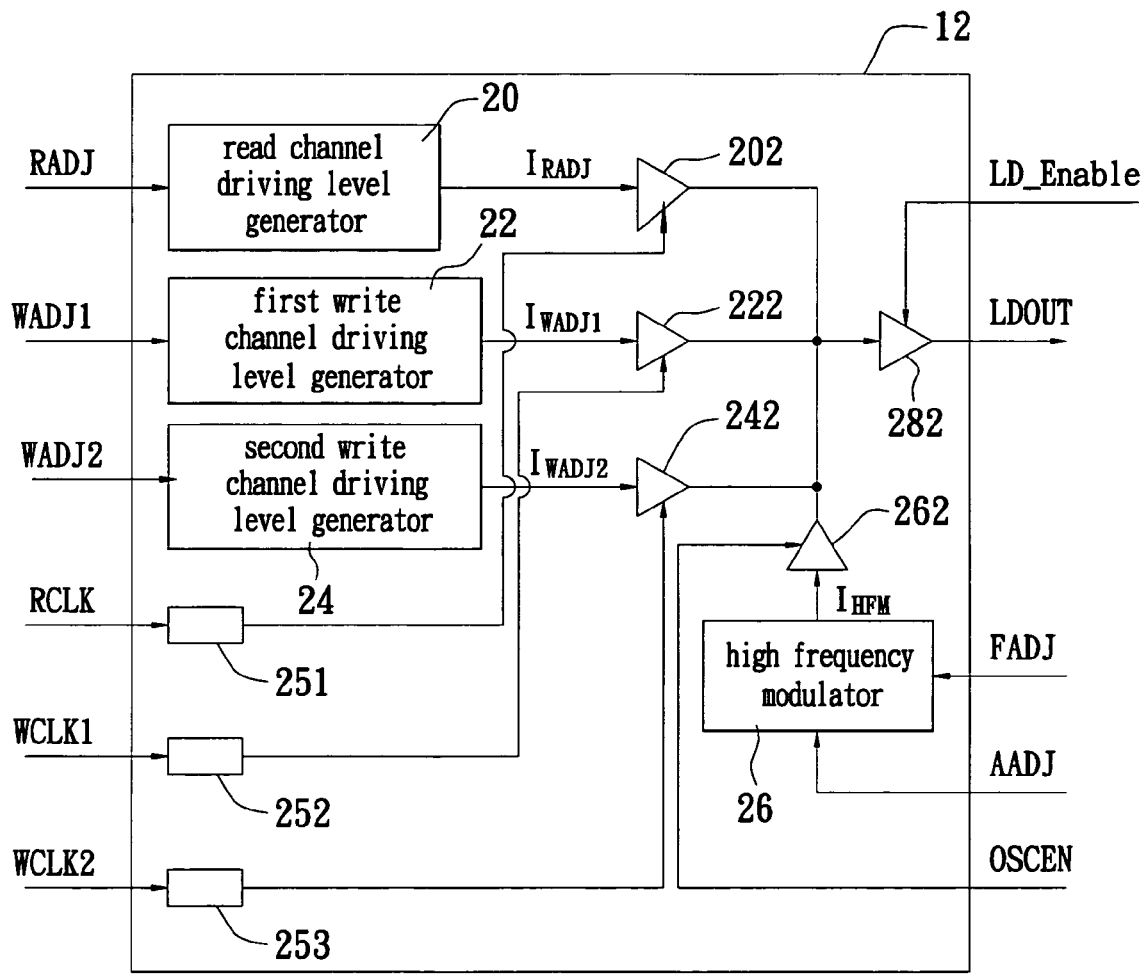
FIG. 2 is a functional block diagram showing the conventional laser diode driver.
Figure 5:
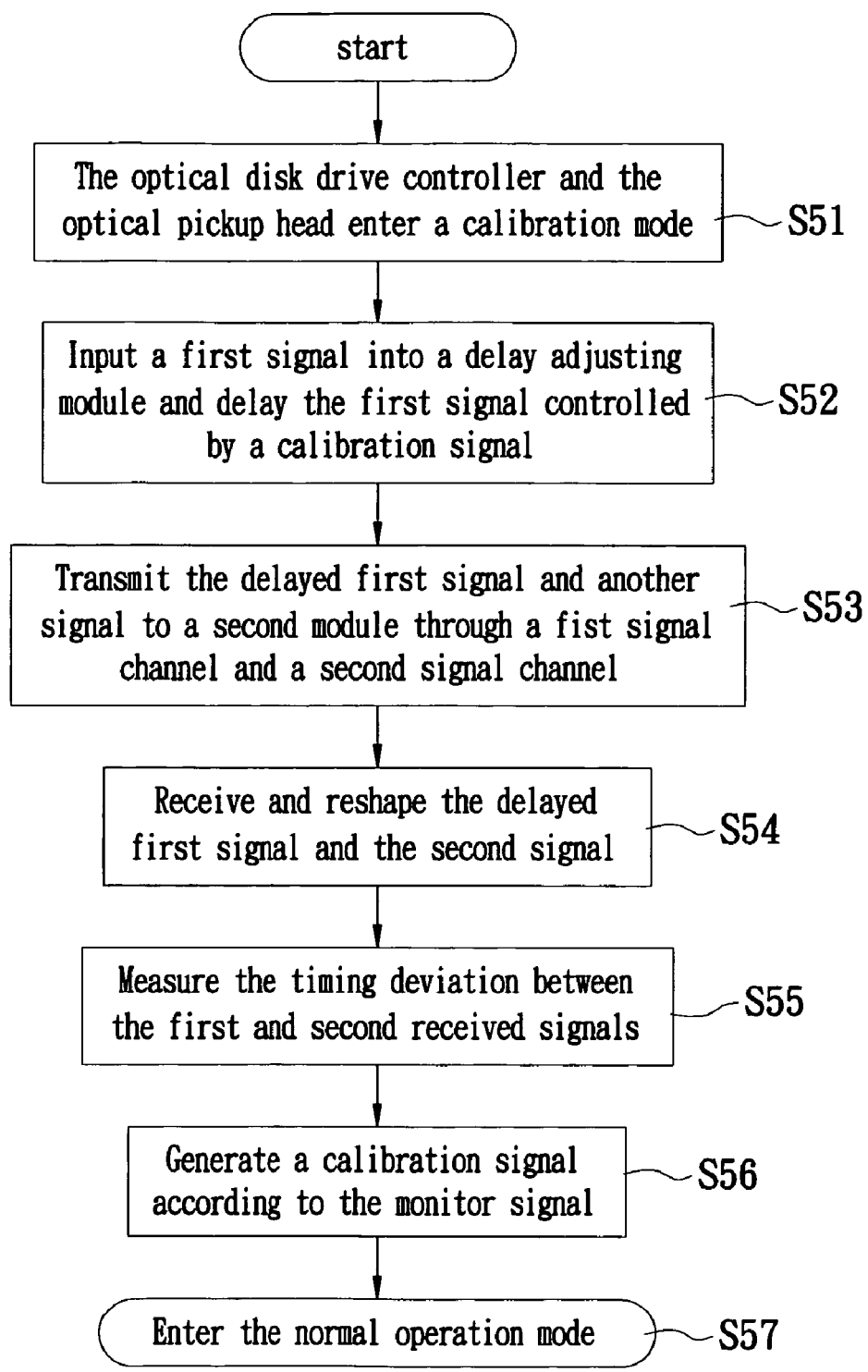
FIG. 5 shows the flow chart illustrating the calibration method according to the present invention.

FIG. 5 is a flow chart illustrating steps of the calibration method according to the present invention. At the time the present invention calibration method begins, the optical disk drive controller and the optical pickup head enter a calibration mode (Step S51). Next, input a first signal into a delay adjusting module and delay the first signal by an amount $T_{delay}$ which is controlled by a calibration signal in order to have a delayed first signal (Step S52). The delayed first signal and another signal (a second signal) are transmitted to a second module through a first signal channel and a second signal channel, respectively (Step S53). The first and second signals are both predetermined periodic signals. The present method further includes steps of receiving and reshaping the delayed first signal and the second signal so as to have the corresponding first received signal and second received signal (Step S54).

Then, measure the timing deviation between the first and second received signals so as to generate a monitor signal reflecting whether the first received signal leads or lags the second received signal (Step S55). The generation of the monitor signal further comprises the following steps. Based on the timing deviation between the first and second received signals, a phase-difference signal is generated. By averaging the phase-difference signal, the mean of these phase-difference signal becomes the monitor signal. In this case, the monitor signal itself will reflect whether the first received signal leads or lags the second received signal. As another embodiment, the mean of the phase-difference signal is integrated to be the monitor signal. In such a case, the slop of the monitor signal will reflect whether the first received signal leads or lags the second received signal.

The generation of the phase-difference signal is quite well known to those skilled in the art. Any way to generate a phase-difference signal reflecting the phase difference between two signals is applicable to the present invention. As an example, a first and a second phase-detection signals are generated to reflect the amount by which the first received signal leads the second received signals and the amount by which the second received signal leads the first received signal, respectively. Then the difference between the first phase-detection signal and the second phase-detection signal is treated as the phase-difference signal.

The calibration signal is generated according to the monitor signal (Step S56). If the monitor signal indicates that the first received signal lags behind the second received signal, the calibration signal will instruct to decrease the delay amount $T_{delay}$. On the other hand, if the monitor signal indicates that the first received signal leads the second received signal, the calibration signal will instruct to increase the delay amount $T_{delay}$.

If the calibration signal indicates the first received signal lags the second received signal, another delay cell one delay cell ahead of the currently selected delay cell is selected and thus the signal output from the newly, selected delay cell becomes the newly delayed first signal. On the other hand, if the calibration signal shows that the first received signal leads the second received signal, another delay cell one delay cell behind the currently selected delay cell is selected and the signal output from the newly selected delay cell becomes the new delayed first signal.

After finishing the calibration step, the optical disk drive controller and the optical pickup head enters the normal operation mode to execute routine reading and writing tasks of the optical disk drive (Step S57).

Steps S52 to S56 practically will executed repeatedly (more than one iteration) in order to progressively reduce the timing deviation between the first and second received signals. When the monitor signal indicates that the timing deviation between these two received signals is less than a predetermined value, the calibration can complete and enter the normal operation stage. At the normal operation stage, any signal to be transmitted through the first signal channel from the first module will be "delayed" by a delay amount, which is calibrated in the calibration mode.

It should be noted that in Step S56 the second signal will not be calibrated since it is the reference used to adjust the first signal channel. In other words, the first signal channel also can be served as the reference for adjusting the second signal channel when the other preferred embodiment calibrates the second signal supposed to be transmitted through the second signal channel.

Furthermore, the calibration method for the optical disk described in the present invention could be applied for all signal channels $CH_1 \sim CH_N$ between optical disk drive controller and optical pickup head. Select two signal channels at a time to be calibrated (such as $CH_1$ and $CH_K$) and take $CH_1$ as reference. Letting K=2, 3, . . . , N, the signal channels $CH_2$ to $CH_N$ could be calibrated sequentially.

From the aforementioned embodiment of the present invention, both the first signal channel and second signal channel start from the same module. The present invention could also be applied if the two signal channels start from different modules.

Moreover, the present invention is also applied for the calibration of more than two signal channels at the same time. While the first module has to transmit three signals at the same time, and the second module therein should adjust the delay setting of the second and third signals. In other words, the second module should detect timing deviation between the first and the second signals and between the first and the third signals, and generates two monitor signals back to the optical disk drive controller.

By the calibration method mentioned above, the timing of the signals could be adequately calibrated such that the optical read/write system could be more stably operated.

Figure 6:
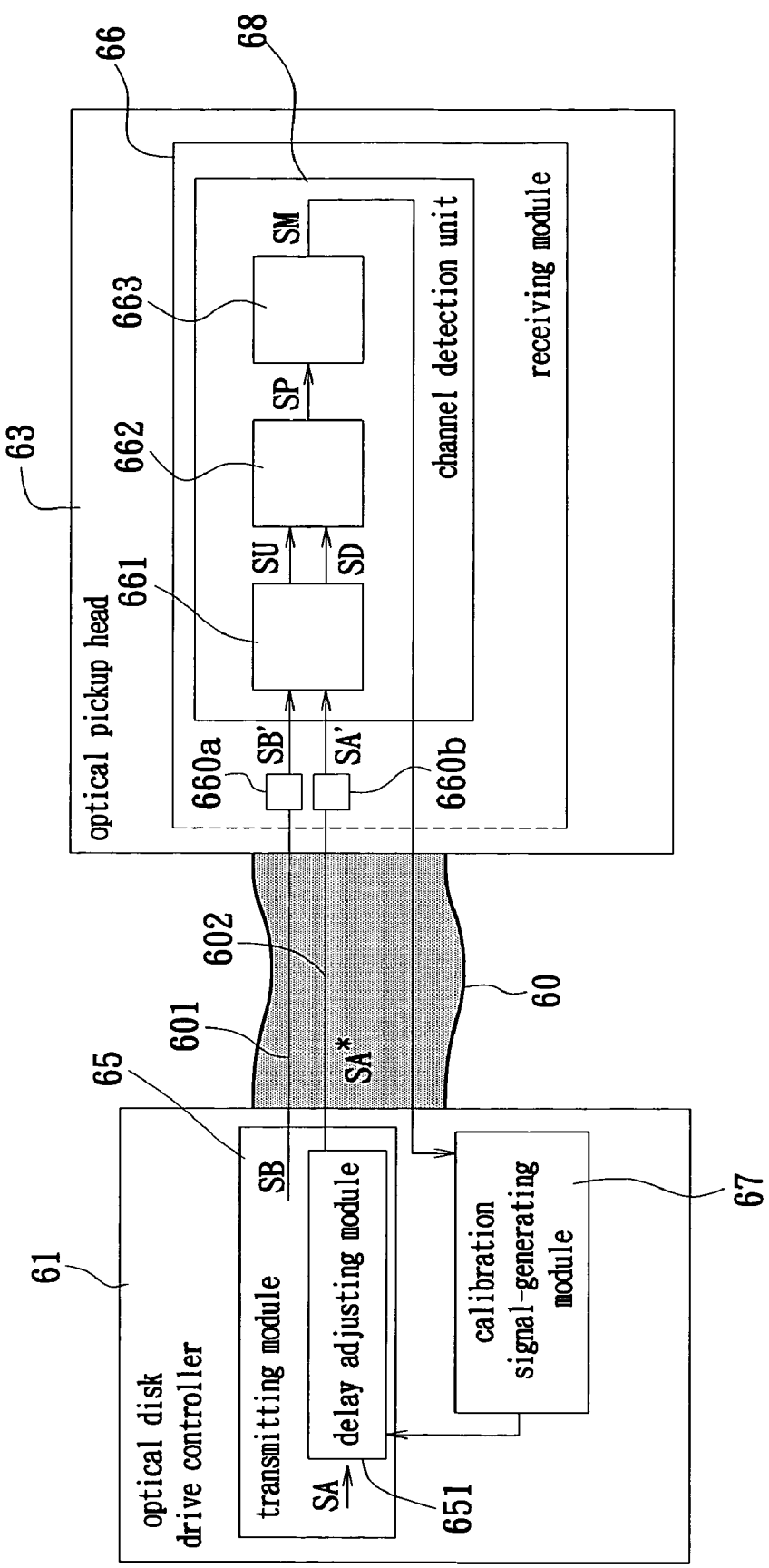
FIG. 6 shows the calibration device according to the present invention.

For the purpose of implementing the above calibration method, the present invention further provides the calibration device shown in FIG. 6. The optical disk drive system includes the optical disk drive controller 61 and the optical pickup head 63. The optical disk drive system enters the calibration mode at the very beginning and then the normal operation mode after completing calibration.

Figure 7A:
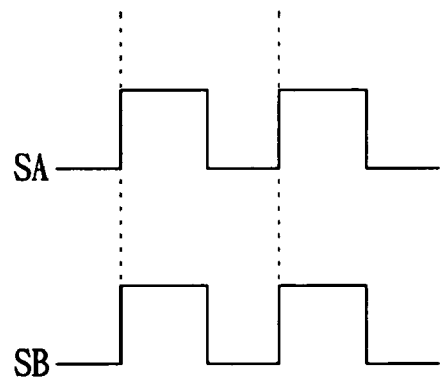
FIG. 7A to 7D shows signal waveforms between modules of calibration device according to the present invention.
Figure 7B:
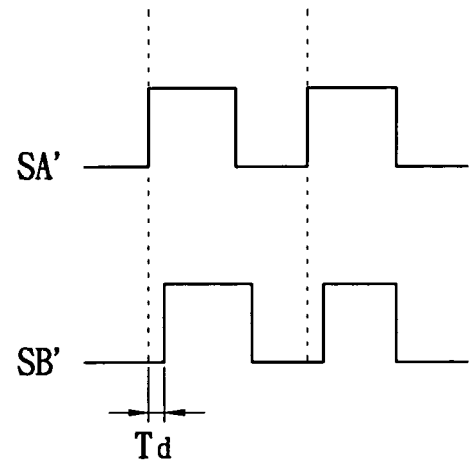

When the calibration mode is entered, the delay adjusting module 651 within the first module 65 (transmitting module) of the optical disk drive controller 61 is for setting a predetermined delay amount to the first signal SA to have a delayed first signal SA* and transmitting the delayed first signal SA* and the second signal SB. Signals SA and SB are predetermined periodic signals. As an example, signals SA and SB shown in FIG. 7 are rectangular waveforms with a duty cycle of 50%. Signals SA* and SB are transmitted to the second module 66 (receiving module) within the optical pickup head 63 through the first signal channel 601 and the second signal channel 602, respectively, and received by the channel detection unit 68 of the second module 66. Waveform reshaping units 660a and 660b of the channel detection unit 68 receive and reshape the signals to have rectangular waveforms, to be as the first received signal SA' and the second received signal SB', respectively. Because of the different characteristics of different signal channels, even if the edges of the signals SA and SB are aligned (no lead/lag) as shown in FIG. 7A, signals SA* and SB does not arrive at the second module 66 at the same time (i.e., timing deviation), because the elapsed time for signals to reach the second module 66 from the first module 65 is different. In other words, there is a timing deviation Td between the first received signal SA' and the second received signal SB' as shown in FIG. 7B.

The channel detection unit 68 includes a phase detection unit 661, a calculating unit 662 and a mean calculating unit 663. The phase detection unit 661 receives the first received signal SA' and the second received signal SB' in order to generate phase detection signals SU and SD reflecting the time amounts by which SA' leads SB' and SB' leads SA', respectively.

Figure 7C:
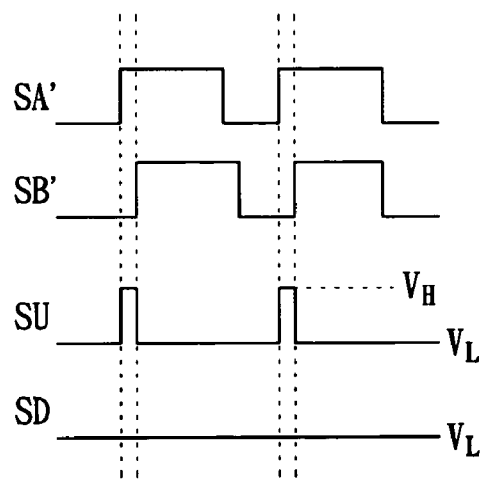
Figure 7D:
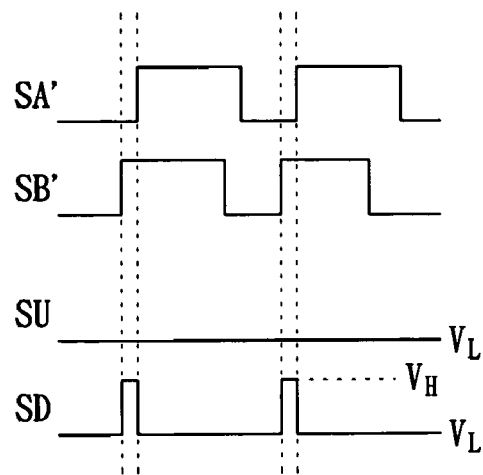

FIG. 7C shows an example of the phase detection signals SU and SD. When the first received signal SA' leads the second received signal SB' the phase detection signal SU remains at the high signal level $V_H$ lasting for a period of time proportional to how long the signal SA' leads the signal SB'. Once the phase detection signal is at its low signal revel $V_L$, SB' does not lead SA'. FIG. 7D shows another example of phase signals SU and SD. When the second received signal SB' leads the first received signal SA', the phase detection signal SD remains at its high signal level $V_H$ and the time length of the high signal level is proportional to how long the signal SB' leads the signal SA'. Once the signal SU is at its low signal level $V_L$, SA' does not lead SB'.

The calculating unit 662 receives the phase detection signals SU and SD, subtracts SU from SD (or SD from SU), and outputs the result of subtraction (signal SP) to the mean calculating unit 663. The mean calculating unit 663 averages signals SP and outputs a monitor signal SM. Practically, the calculating unit 662 is a subtractor, and the mean calculating unit 663 could be a low-pass filter. The monitor signal SM generated by the mean calculating unit 663 is feedback to the calibration signal-generating module 67 within the optical disk drive controller 61 through the flexible cable 60 and the calibration signal-generating module 67 generates a calibration signal to the delay adjusting module 651 based on the monitor signal SM.

Figure 8:
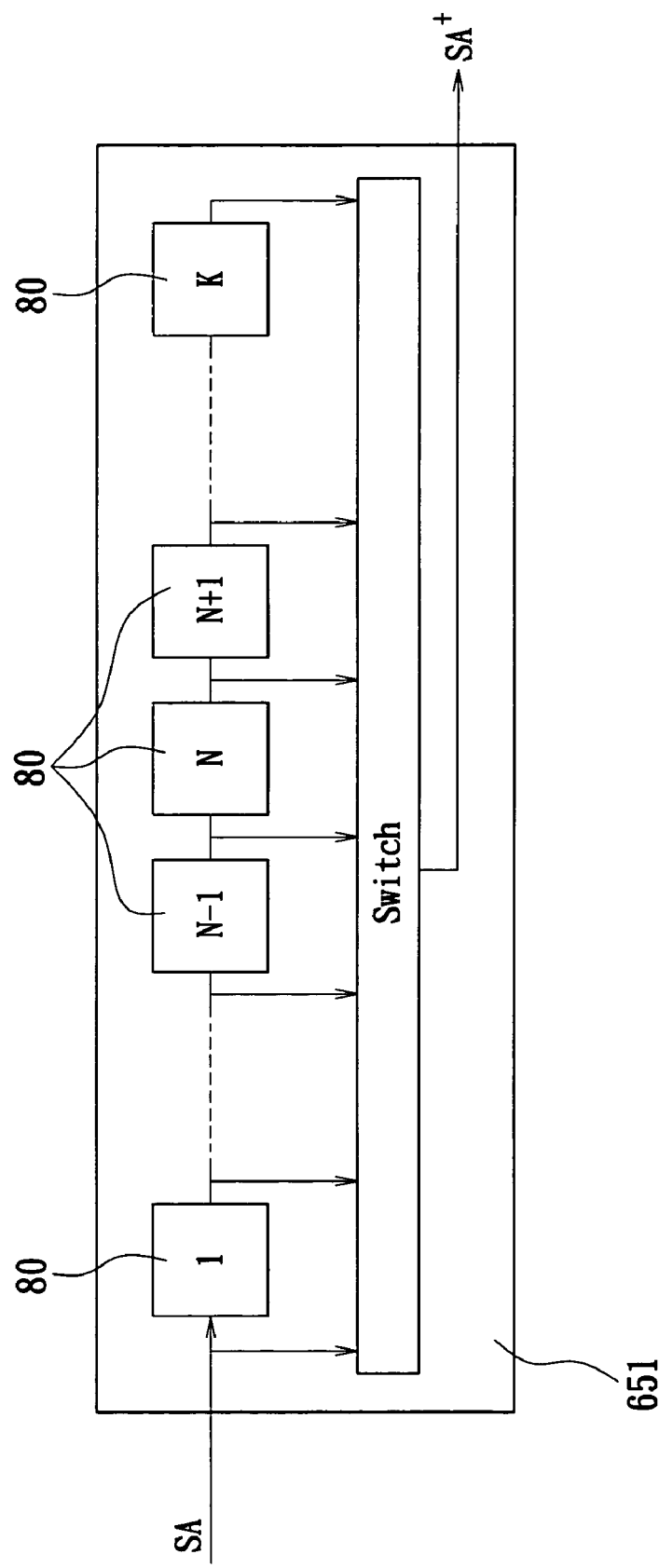
FIG. 8 shows the functional block diagram of the delay adjusting module of the preferred embodiment.

The delay adjusting module 651 adjusts the delay amount applied to the first signal according to the calibration signal. As an example shown in FIG. 8, the delay adjusting module 651 includes a plurality of delay cells 80 serially connected together, such as cells 1 . . . N−1, N, N+1 . . . , K shown in the diagram. The delay adjusting module 651 receives the first signal SA and outputs the output signal of the N-th delay cell 80 as the delayed first signal SA*, wherein the integer N is a delay index determined by the calibration signal.

The calibration signal-generating module 67 generates the calibration signal according to the monitor signal SM. If the monitor signal SM indicates that the first received signal lags behind the second received signal, the calibration signal-generating module 67 generates a calibration signal to instruct the delay adjusting module 651 to decrease the delay index N. Preferably, the decrease amount is one. On the other hand, if the monitor signal SM indicates that the first received signal leads the second received signal, the calibration signal-generating module 67 generates a calibration signal to instruct the delay adjusting module 651 to increase the delay index N. Preferably, the increase amount is one.

Those skilled in the art will readily observe that numerous modifications and alterations of the device may be made while retaining the teachings of the invention. Accordingly, the above disclosure should be construed as limited by the metes and bounds of the appended claims.

What is claimed is:

1. A calibration device for signals of an optical drive system having an optical disk drive controller and an optical pickup head connected by a flexible cable, for calibrating a plurality of signals transmitted by a first module of the optical disk drive controller, each transmitting to a second module of the optical pickup head through respective signal channels, wherein the second module receives and reshapes the received signals and the calibration device is used to make up the timing deviation between the received signals, the calibration device comprising:

a delay adjusting module located within the first module for delaying a first signal by an amount specified by a calibration signal, wherein the first module transmits the delayed first signal and a second signal through a first signal channel and a second signal channel, respectively, to the second module of the optical pickup head;

a monitoring module located within the optical pickup head for receiving and reshaping the delayed first signal and the second signal to obtain a first received signal and a second received signal, respectively, so as to generate a monitor signal reflecting a timing deviation between the first received signal and the second received signal; and a calibration signal generating module located within the optical disk drive controller for receiving the monitor signal so as to generate the calibration signal.

2. The calibration device in claim 1, wherein the monitor module comprises:

a phase detection module for receiving the first received signal and the second received signal in order to generate a phase-difference signal reflecting the timing deviation between the first received signal and the second received signal; and a mean calculating unit for averaging the phase-difference signals and outputting an average as the monitor signal.

3. The calibration device in claim 2, wherein the phase detection module further comprises:

a phase detection unit for receiving the first received signal and the second received signal and generating a first phase detection signal and a second phase detection signal, respectively reflecting a first amount of time by which the first received signal leads the second received signal and a second amount of time by which the second received signal leads the first received signal; and a subtractor for receiving the first phase detection signal and the second phase detection signal and then generating the phase-difference signal based on a difference between the first and second phase detection signals.

4. The calibration device in claim 2, wherein the mean calculating unit is a low-pass filter.

5. The calibration device in claim 2, wherein the first signal and the second signal are predetermined periodic signals.

6. The calibration device in claim 1, wherein the delay adjusting module includes a plurality of delay cells serially connected together for receiving the first signal, wherein the delay adjusting module selects one of the delay cells according to the calibration signal and outputs the signal output of the selected delay cell as the delayed first signal.

7. The calibration device in claim 6, wherein when the calibration signal shows the first received signal lags behind the second received signal the delay adjusting module makes the delay cell one unit ahead of the currently selected delay cell to be the newly selected delay cell, otherwise the delay adjusting module makes the delay cell one unit behind the currently selected to be the newly selected delay cell, and then outputs the signal output of the newly selected delay cell as the delayed first signal.

8. A calibration method for signals of an optical drive system having an optical disk drive controller and an optical pickup head connected by a flexible cable, for calibrating a plurality of signals transmitted by a first module of the optical disk drive controller, each transmitted to a second module of the optical pickup head through respective signal channels, wherein the second module receives and reshapes the received signals and the calibration method is used to compromise the timing deviation between received signals, the calibration method comprising:

delaying a first signal by an amount according to a calibration signal in order to generate a delayed first signal;

transmitting the delayed first signal and a second signal through a first signal channel and a second signal channel, respectively, to the second module of the optical pickup head;

receiving and reshaping the delayed first signal and the second signal in order to have a first received signal and a second received signal;

monitoring a timing deviation between the first received signal and the second received signal in order to have a monitor signal; and generating the calibration signal according to the monitor signal.

9. The calibration method in claim 8, wherein the step of generating the monitor signal comprises steps of obtaining a phase-difference signal to reflect the timing deviation between the first received signal and the second received signal and averaging the phase-difference signal in order to have the monitor signal.

10. The calibration method in claim 9, wherein the first and the second signals are predetermined periodic signals.

11. The calibration method in claim 9, wherein the step of generating the phase-difference signal comprises steps of obtaining a first phase detection signal and a second phase detection signal to reflect the timing deviation between the first received signal and the second received signal, and subtracting the first phase detection signal from the second phase detection signal so as to have the phase-difference signal, wherein the first phase detection signal and the second phase detection signal reflect a first amount of time by which the first received signal leads the second received signal and a second amount of time by which the second received signal leads the first received signal, respectively.

12. The calibration method in claim 8, further includes a step of decreasing the delay amount of the delayed first signal when the calibration signal shows the first received signal lags behind the second received signal, and increasing the delay amount of the delayed first signal when the calibration signal shows the first received signal leads the second received signal.

* * * * *